(12) United States Patent
Kim et al.

(10) Patent No.: US 11,588,169 B2
(45) Date of Patent: Feb. 21, 2023

(54) FUEL CELL AND METHOD OF MANUFACTURING THE SAME

(71) Applicants: Hyundai Motor Company, Seoul (KR); Kia Motors Corporation, Seoul (KR)

(72) Inventors: Duck Whan Kim, Gyeonggi-do (KR); Yong Suk Heo, Seoul (KR); Suk Min Baeck, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 334 days.

(21) Appl. No.: 16/552,602

(22) Filed: Aug. 27, 2019

(65) Prior Publication Data
US 2020/0185750 A1 Jun. 11, 2020

(30) Foreign Application Priority Data
Dec. 6, 2018 (KR) .................. 10-2018-0155990

(51) Int. Cl.
*H01M 8/2475* (2016.01)
*H01M 8/2484* (2016.01)
*H01M 8/10* (2016.01)

(52) U.S. Cl.
CPC ....... *H01M 8/2475* (2013.01); *H01M 8/2484* (2016.02); *H01M 2008/1095* (2013.01); *H01M 2250/20* (2013.01); *Y02E 60/50* (2013.01); *Y02P 70/50* (2015.11)

(58) Field of Classification Search
CPC ..... H01M 2008/1095; H01M 2250/20; H01M 8/2475; H01M 8/2484; Y02E 60/50; Y02P 70/50
See application file for complete search history.

(56) References Cited

U.S. PATENT DOCUMENTS

| 2005/0255342 A1* | 11/2005 | Lee ..................... H01M 8/2475 429/457 |
| 2010/0133028 A1* | 6/2010 | Saito ..................... H01M 8/248 180/65.31 |
| 2016/0226092 A1* | 8/2016 | Nishiyama ............ H01M 8/241 |

FOREIGN PATENT DOCUMENTS

| JP | 5145623 B2 | 2/2013 |
| KR | 101765991 B1 | 8/2017 |
| KR | 101836496 B1 | 3/2018 |

* cited by examiner

*Primary Examiner* — Lingwen R Zeng
(74) *Attorney, Agent, or Firm* — Fox Rothschild LLP

(57) ABSTRACT

A fuel cell includes a cell stack including a plurality of unit cells stacked in a first direction; a first end plate including a guide through-hole formed therein, the first end plate being disposed on one end of two ends of the cell stack; a second end plate including a guide support hole formed therein, the guide support hole overlapping the guide through-hole in the first direction, the second end plate being disposed on an opposite end of the two ends of the cell stack; and an enclosure surrounding a side portion between the two ends of the cell stack together with the first end plate and the second end plate, the enclosure being formed as a unitary structure. The enclosure includes a body surrounding the side portion of the cell stack and first and second ends coupled to the first end plate and the second end plate, respectively.

18 Claims, 10 Drawing Sheets

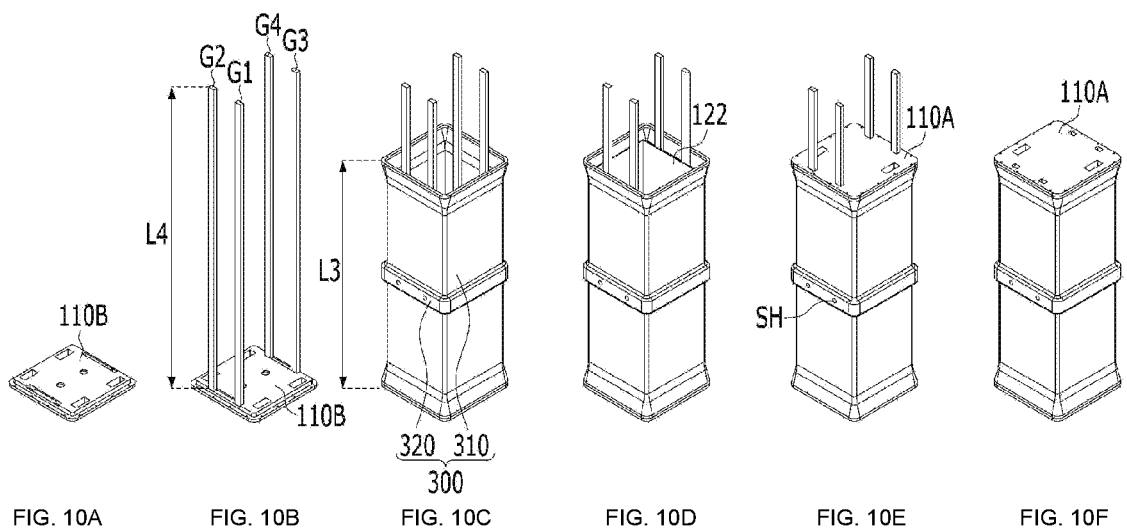
FIG. 10A  FIG. 10B  FIG. 10C  FIG. 10D  FIG. 10E  FIG. 10F
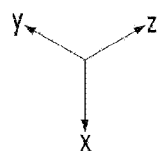

FUEL CELL AND METHOD OF MANUFACTURING THE SAME

CROSS-REFERENCE TO RELATED APPLICATION(S)

This application claims under 35 U.S.C. § 119(a) the benefit of Korean Patent Application No. 10-2018-0155990, filed on Dec. 6, 2018, which is hereby incorporated by reference herein.

BACKGROUND

(a) Technical Field

The present disclosure relates to a fuel cell and a method of manufacturing the same.

(b) Description of the Related Art

In general, a fuel cell includes a polymer electrolyte membrane, and generates electricity using air supplied to one surface of the membrane and hydrogen supplied to an opposite side of the membrane. Such a fuel cell serves to supply electricity to a vehicle. In the process of manufacturing a fuel cell, various problems may occur when a plurality of stacked cells is pressed. Therefore, there has been demand for solutions to the problems related to the plurality of stacked cells being pressed.

SUMMARY

As provided herein, a fuel cell and a method of manufacturing the same are provided for solving various problems caused when a plurality of stacked unit cells is pressed.

In one embodiment, a fuel cell may include a cell stack including a plurality of unit cells stacked in a first direction; a first end plate including a guide through-hole formed therein, the first end plate being disposed on one end of two ends of the cell stack; a second end plate including a guide support hole formed therein, the guide support hole overlapping the guide through-hole in the first direction, the second end plate being disposed on an opposite end of the two ends of the cell stack; and an enclosure surrounding a side portion between the two ends of the cell stack together with the first end plate and the second end plate, the enclosure being formed as a unitary structure, wherein the enclosure may include a body surrounding the side portion of the cell stack and first and second ends coupled to the first end plate and the second end plate, respectively.

For example, the second end plate and the enclosure may be integrally formed with each other.

For example, the enclosure may further include a rigidity-enhancing part disposed between the first and second ends of the body.

For example, a first distance between the first end of the body and the rigidity-enhancing part may be the same as a second distance between the second end of the body and the rigidity-enhancing part.

For example, the rigidity-enhancing part may be disposed in a strap shape on the body.

For example, the rigidity-enhancing part may be disposed on at least one of an inner surface or an outer surface of the body.

For example, the body and the rigidity-enhancing part may be integrally formed with each other.

For example, the fuel cell may further include a cap disposed in at least one of the guide support hole or the guide through-hole.

For example, the fuel cell may further include an air intake member configured to suction first air that has circulated in an internal space between the enclosure and the cell stack, any one of the guide support hole and the guide through-hole may correspond to an inlet suctioning second air from an outside into the internal space between the enclosure and the cell stack, and the remaining one of the guide support hole and the guide through-hole may correspond to an outlet discharging the first air to the air intake member.

For example, the rigidity-enhancing part may have a first thickness greater than a second thickness of the body.

For example, the side portion of the cell stack may include a first side portion in which a first manifolds is disposed, a second side portion in which a second manifold is disposed, the second side portion being disposed opposite the first side portion in a second direction that is different from the first direction, and a third side portion and a fourth side portion disposed opposite each other in a third direction that intersects the first direction and the second direction, and the enclosure may further include at least one support through-hole formed therein, the support through-hole penetrating the rigidity-enhancing part and the body and facing at least one of the third side portion or the fourth side portion.

For example, the guide support hole formed in the second end plate may include at least one of a first guide support hole overlapping a first space, defined between the third side portion of the cell stack and the enclosure, in the first direction, or a second guide support hole overlapping a second space, defined between the fourth side portion of the cell stack and the enclosure, in the first direction.

For example, the guide through-hole formed in the first end plate may include at least one of a first guide through-hole overlapping a first space, defined between the third side portion of the cell stack and the enclosure, in the first direction, or a second guide through-hole overlapping a second space, defined between the fourth side portion of the cell stack and the enclosure, in the first direction.

For example, the outer surface of the first side portion of the cell stack and the enclosure may be spaced apart from each other by a first distance, the outer surface of the second side portion of the cell stack and the enclosure may be spaced apart from each other by a second distance, the outer surface of the third side portion of the cell stack and the enclosure may be spaced apart from each other by a third distance, the outer surface of the fourth side portion of the cell stack and the enclosure may be spaced apart from each other by a fourth distance, and each of the first distance and the second distance may be shorter than the third distance or the fourth distance.

For example, each of the third side portion and the fourth side portion of the cell stack may include a guide-receiving recess formed therein, the guide-receiving recess facing an inner surface of the enclosure and extending in the first direction.

In another embodiment, a method of manufacturing the fuel cell may include coupling a guide member to the guide support hole, coupling the enclosure to the second end plate so as to surround the guide member, stacking the plurality of unit cells while being guided by the guide member, stacking the first end plate on a last stacked unit cell of the plurality of unit cells while fitting the guide member into the guide through-hole, pressing the plurality of unit cells stacked between the first end plate and the second end plate, and removing the guide member.

For example, the method may further include, before the pressing the plurality of unit cells, fitting a support member into the support through-hole to support the guide member, and after the pressing the plurality of unit cells and before the removing the guide member, removing the support member from the support through-hole.

For example, the support member may have higher rigidity than the guide member.

For example, the guide member may have a greater length than the enclosure in the first direction.

For example, the guide member may include at least three guide members.

BRIEF DESCRIPTION OF THE DRAWINGS

Arrangements and embodiments may be described in detail with reference to the following drawings in which like reference numerals refer to like elements and wherein:

FIGS. 10(a) to 10(f) are sequential steps in the method of manufacturing the fuel cell shown in FIG. 9.

DETAILED DESCRIPTION OF THE DISCLOSURE

Figure 1:
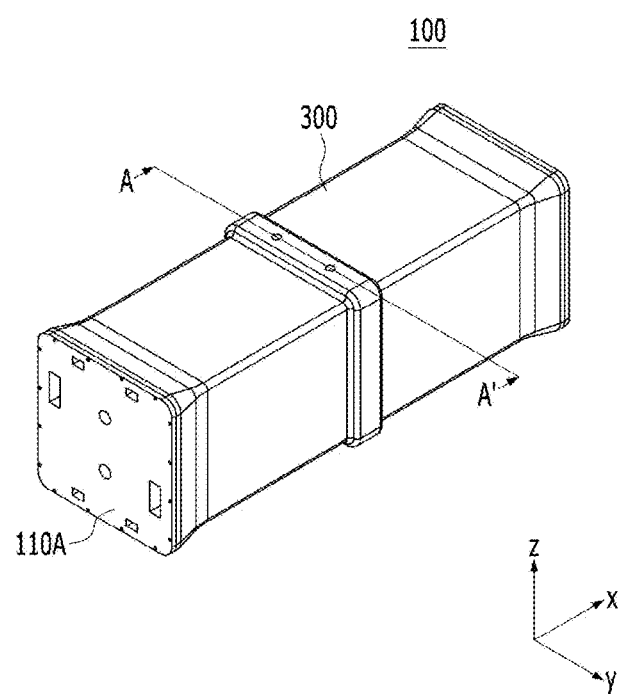
FIG. 1 is a coupled perspective view of a fuel cell according to an embodiment.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

The present disclosure will now be described more fully hereinafter with reference to the accompanying drawings, in which various embodiments are shown. The examples, however, be embodied in many different forms and should not be construed as being limited to the embodiments set forth herein. Rather, these embodiments are provided so that this disclosure will be more thorough and complete, and will more fully convey the scope of the disclosure to those skilled in the art.

Hereinafter, a fuel cell 100 according to embodiments will be described with reference to the accompanying drawings. The fuel cell 100 will be described using a Cartesian coordinate system (x, y, z) for convenience of description. However, other different coordinate systems may be used. In the drawings, an x-axis, a y-axis, and a z-axis of the Cartesian coordinate system are perpendicular to each other. However, the embodiment is not limited thereto. That is, the x-axis, the y-axis, and the z-axis may intersect each other.

Figure 2:
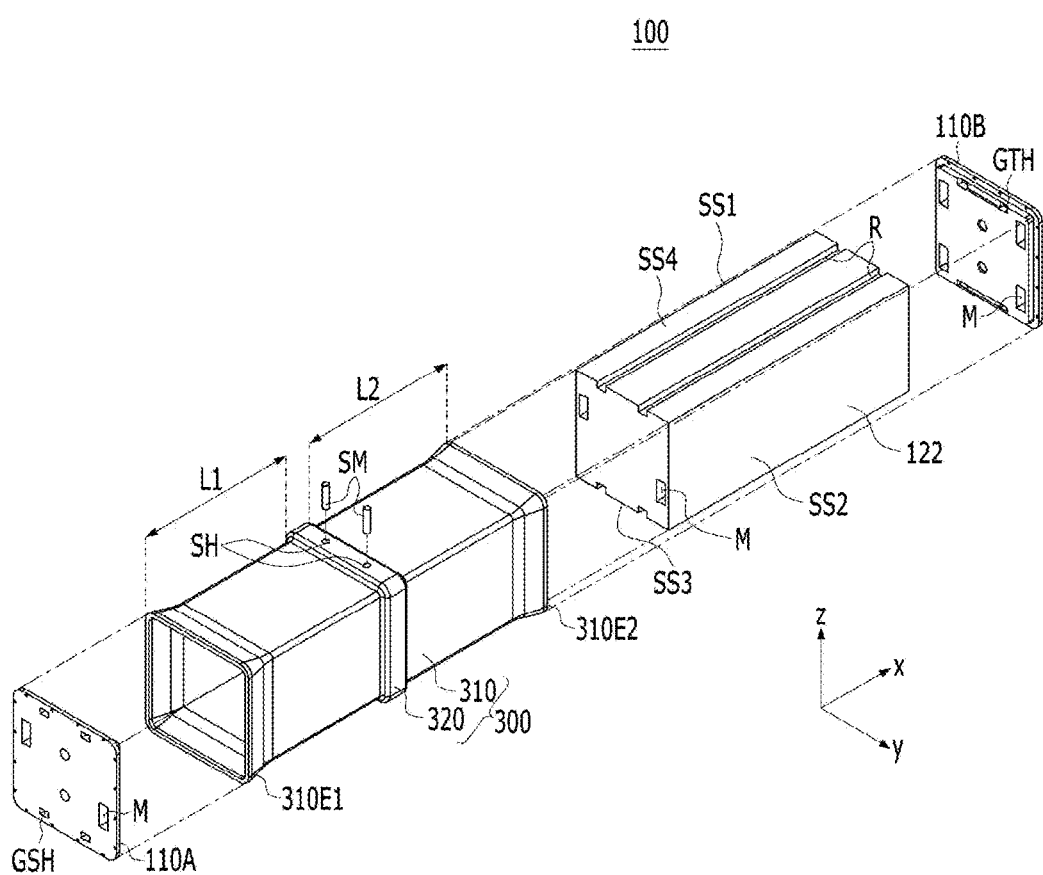
FIG. 2 is an exploded perspective view of the fuel cell shown in FIG. 1.
Figure 3:
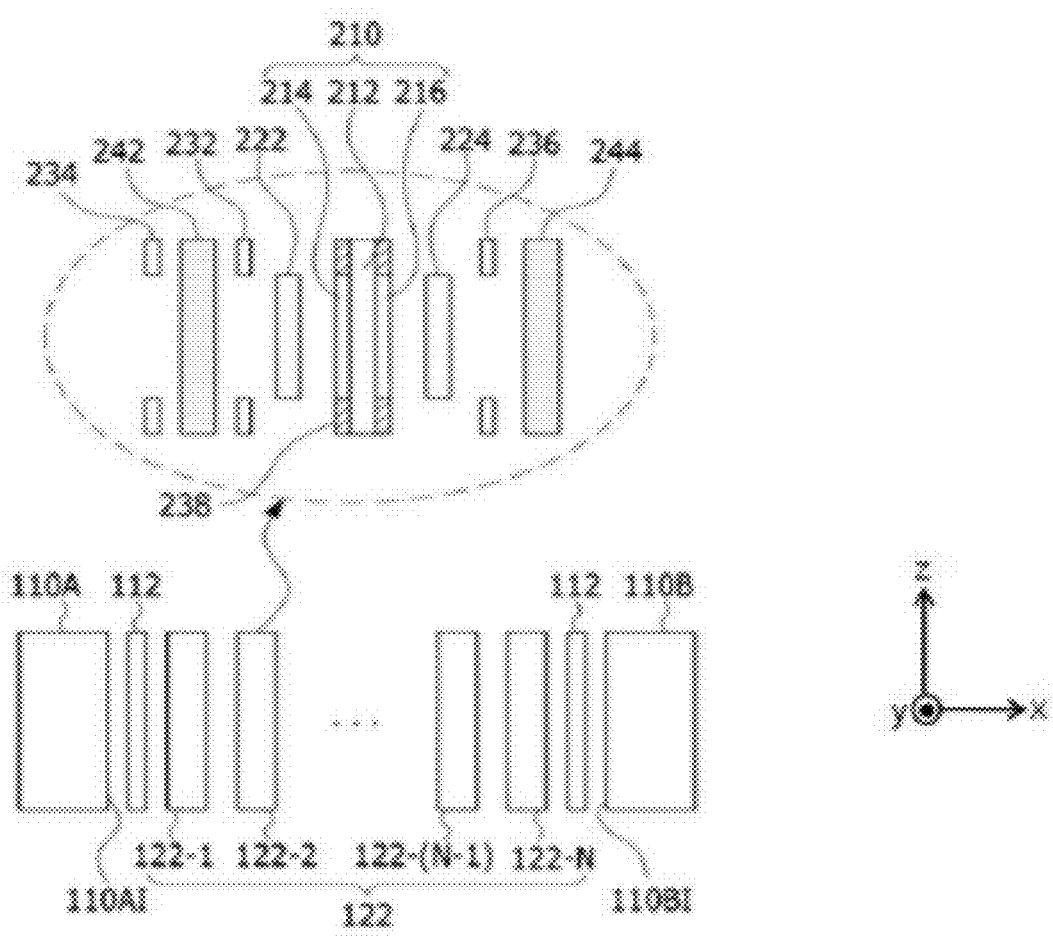
FIG. 3 is a cross-sectional view of first and second end plates and a cell stack.

FIG. 1 is a coupled perspective view of a fuel cell 100 according to an embodiment, FIG. 2 is an exploded perspective view of the fuel cell 100 shown in FIG. 1, and FIG. 3 is a cross-sectional view of first and second end plates 110A and 110B and a cell stack 122. For convenience of description, the illustration of the enclosure 300 shown in FIGS. 1 and 2 is omitted from FIG. 3.

The fuel cell 100 may be, for example, a polymer electrolyte membrane fuel cell (or a proton exchange membrane fuel cell) (PEMFC), which has been studied extensively as a power source for driving a vehicle. However, the embodiment is not limited as to the specific form of the fuel cell.

The fuel cell 100 may include first and second end plates (pressing plates or compression plates) 110A and 110B, current collectors 112, a cell stack 122, and an enclosure 300.

Although the cell sack 122 shown in FIG. 3 will be described by way of example, the fuel cell according to the embodiment is not limited to any specific structure of the cell stack 122.

The cell stack 122 may include a plurality of unit cells 122-1 to 122-N, which are stacked in a first direction (e.g., the x-axis direction). Here, "N" is a positive integer greater than or equal to 1, and may range from several tens to several hundreds. "N" may range, for example, from 100 to 300, and specifically may be 220. However, the embodiment is not limited to a specific value of "N".

Each unit cell 122-$n$ (where $1 \leq n \leq N$) may generate about 0.6 volts to 1.0 volts of electricity, on average, about 0.7 volts of electricity. Thus, "N" may be determined in accordance with the intensity of the power to be supplied from the fuel cell 100 to a load. Here, the load may refer to a part of a vehicle that requires power when the fuel cell 100 is used in a vehicle.

Each unit cell 122-$n$ may include a membrane electrode assembly (MEA) 210, gas diffusion layers (GDLs) 222 and 224, gaskets 232, 234 and 236, and separators (or bipolar plates) 242 and 244.

The membrane electrode assembly 210 has a structure in which catalyst electrode layers, in which electrochemical reaction occurs, are attached to both sides of an electrolyte membrane through which hydrogen ions move. Specifically, the membrane electrode assembly 210 may include a polymer electrolyte membrane (or a proton exchange membrane) 212, a fuel electrode (a hydrogen electrode or an anode) 214, and an air electrode (an oxygen electrode or a cathode) 216. In addition, the membrane electrode assembly 210 may further include a sub-gasket 238.

The polymer electrolyte membrane 212 is disposed between the fuel electrode 214 and the air electrode 216.

Hydrogen, which is the fuel in the fuel cell 100, may be supplied to the fuel electrode 214 through the first separator 242, and air containing oxygen as an oxidizer may be supplied to the air electrode 216 through the second separator 244.

The hydrogen supplied to the fuel electrode 214 is decomposed into hydrogen ions (protons) (H+) and electrons (e−) by the catalyst. Only the hydrogen ions may be selectively transferred to the air electrode 216 through the polymer electrolyte membrane 212, and at the same time, the electrons may be transferred to the air electrode 216 through the separators 242 and 244, which are conductors. In order to realize the above operation, a catalyst layer may be applied to each of the fuel electrode 214 and the air electrode 216. The movement of the electrons described above causes the electrons to flow through an external wire, thus generating current. That is, the fuel cell 100 may generate power due to the electrochemical reaction between hydrogen, which is fuel, and oxygen contained in the air.

In the air electrode 216, the hydrogen ions supplied through the polymer electrolyte membrane 212 and the electrons transferred through the separators 242 and 244 meet oxygen in the air supplied to the air electrode 216, thus causing a reaction of generating water ("condensate water" or "product water").

In some cases, the fuel electrode 214 may be referred to as an anode, and the air electrode 216 may be referred to as a cathode. Alternatively, the fuel electrode 214 may be referred to as a cathode, and the air electrode 216 may be referred to as an anode.

The gas diffusion layers 222 and 224 serve to uniformly distribute hydrogen and oxygen, which are reaction gases, and to transfer the generated electric energy. To this end, the gas diffusion layers 222 and 224 may be disposed on respective sides of the membrane electrode assembly 210. That is, the first gas diffusion layer 222 may be disposed on the left side of the fuel electrode 214, and the second gas diffusion layer 224 may be disposed on the right side of the air electrode 216.

The first gas diffusion layer 222 may serve to diffuse and uniformly distribute hydrogen supplied as a reactant gas through the first separator 242, and may be electrically conductive. The second gas diffusion layer 224 may serve to diffuse and uniformly distribute air supplied as a reactant gas through the second separator 244, and may be electrically conductive.

Each of the first and second gas diffusion layers 222 and 224 may be a microporous layer in which fine carbon fibers are combined.

The gaskets 232, 234 and 236 may serve to maintain the airtightness and clamping pressure of the cell stack at an appropriate level with respect to the reactant gases and the coolant, to disperse the stress when the separators 242 and 244 are stacked, and to independently seal the flow paths. As such, since airtightness and watertightness are maintained by the gaskets 232, 234 and 236, the flatness of the surfaces that are adjacent to the cell stack 122 generating power may be secured, and thus surface pressure may be distributed uniformly over the reaction surface of the cell stack 122.

The separators 242 and 244 may serve to move the reactant gases and the cooling medium and to separate each of the unit cells from the other unit cells. In addition, the separators 242 and 244 may serve to structurally support the membrane electrode assembly 210 and the gas diffusion layers 222 and 224 and to collect the generated current and transfer the collected current to the current collectors 112.

The separators 242 and 244 may be disposed outside the gas diffusion layers 222 and 224, respectively. That is, the first separator 242 may be disposed on the left side of the first gas diffusion layer 222, and the second separator 244 may be disposed on the right side of the second gas diffusion layer 224.

The first separator 242 serves to supply hydrogen as a reactant gas to the fuel electrode 214 through the first gas diffusion layer 222. The second separator 244 serves to supply air as a reactant gas to the air electrode 216 through the second gas diffusion layer 224. In addition, each of the first and second separators 242 and 244 may form a channel through which a cooling medium (e.g., coolant) may flow. Further, the separators 242 and 244 may be formed of a graphite-based material, a composite graphite-based material, or a metal-based material. However, the embodiment is not limited as to the specific material of the separators 242 and 244.

Figure 4:
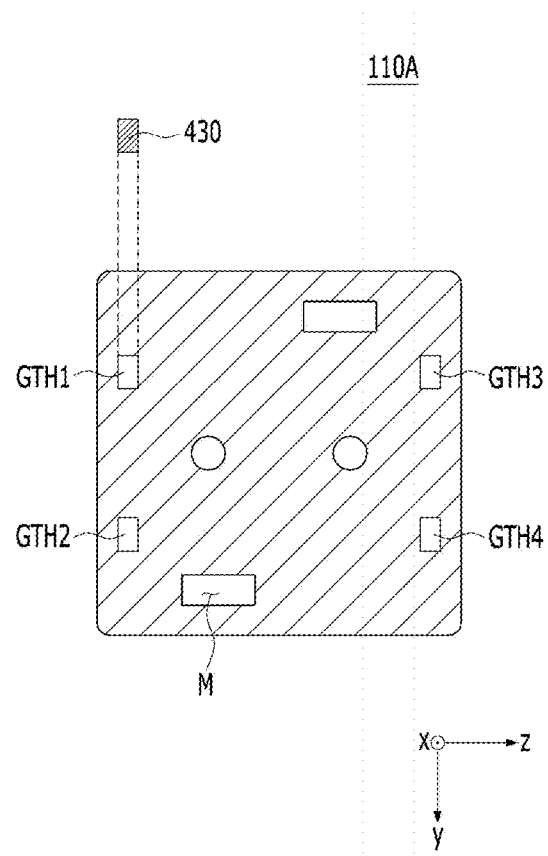
FIG. 4 is a front view (or a rear view) of an embodiment of the first end plate shown in FIGS. 1 to 3.
Figure 5:
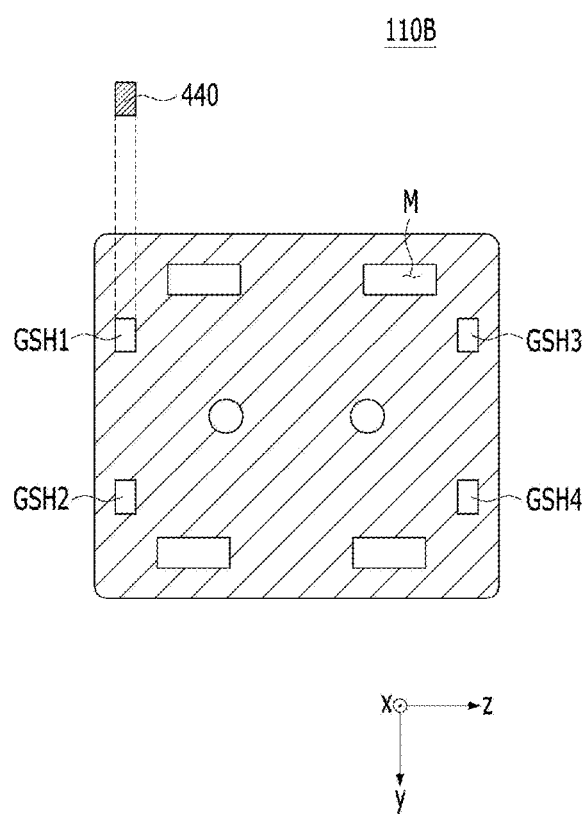
FIG. 5 is a front view (or a rear view) of an embodiment of the second end plate shown in FIGS. 1 to 3.

FIGS. 4 and 5 are front views (or rear views) respectively showing embodiments of the first and second end plates 110A and 110B shown in FIGS. 1 to 3.

The first end plate 110A may be disposed at one end of the cell stack 122, and the second end plate 110B may be disposed at the opposite end of the cell stack 122. The first and second end plates 110A and 110B may serve to support and fix the unit cells 122-1 to 122-N.

Each of the first and second end plates 110A and 110B may be configured such that a metal insert is surrounded by a plastic injection-molded product. The metal insert of each of the first and second end plates 110A and 110B may have high rigidity to withstand internal surface pressure, and may be formed by machining a metal material. For example, each of the first and second end plates 110A and 110B may be formed by combining a plurality of plates. However, the embodiment is not limited to any specific configuration of the first and second end plates 110A and 110B.

The first end plate 110A may include a plurality of guide through-holes or a single guide through-hole formed therein. Although it is illustrated in FIG. 4 that the first end plate 110A includes four guide through-holes GTH (GTH1 to GTH4) formed therein, the embodiment is not limited to any specific number of guide through-holes.

The second end plate 110B may include a plurality of guide support holes or a single guide support hole formed therein. Although it is illustrated in FIG. 5 that the second end plate 110B includes four guide support holes GSH (GSH1 to GSH4) formed therein, the embodiment is not limited to any specific number of guide support holes.

According to another embodiment, the number of guide through-holes may be 3 or may be greater than 4, and the number of guide support holes may be 3 or may be greater than 4.

Hereinafter, the fuel cell according to the embodiment will be described on the assumption that the first end plate 110A includes four guide through-holes GTH (GTH1 to GTH4) formed therein and that the second end plate 110B includes four guide support holes GSH (GSH1 to GSH4) formed therein. However, the following description may also be applied to the configuration in which the number of the guide through-holes GTH is three or is five or greater or the number of the guide support holes GSH is three or is five or greater.

The guide through-holes GTH1 to GTH4 and the guide support holes GSH1 to GSH4 are the portions that contact guide members G1 to G4 used in manufacturing the fuel cell 100, which will be described later. Therefore, the number of the guide through-holes GTH1 to GTH4 and the number of the guide support holes GSH1 to GSH4 may be the same as the number of the guide members G1 to G4.

As shown in FIG. 10, which will be described later, in the case in which the fuel cell 100 is manufactured in the manner of stacking a plurality of unit cells 122-1 to 122-N on the second end plate 110B, stacking the first end plate 110A on the last stacked unit cell 122-N, and pressing the stacked unit cells 122-1 to 122-N, the second end plate 110B includes the guide support holes GSH1 to GSH4 formed therein, and the first end plate 110A includes the guide through-holes GTH1 to GTH4 formed therein. Alternatively, unlike the configuration shown in FIG. 10, in the case in which the fuel cell 100 is manufactured in the manner of stacking a plurality of unit cells on the first end plate 110A, stacking the second end plate 110B on the last stacked unit cell 122-N, and pressing the stacked unit cells 122-1 to 122-N, the first end plate 110A may include the guide support holes GSH1 to GSH4 formed therein, and the second end plate 110B may include the guide through-holes GTH1 to GTH4 formed therein.

Further, since the guide members G1 to G4 used in manufacturing the fuel cell 100 are supported by the guide support holes GSH1 to GSH4 and penetrate the guide through-holes GTH1 to GTH4, the guide support holes GSH1 to GSH4 and the guide through-holes GTH1 to GTH4 may overlap each other in a first direction (e.g., the x-axis direction) in which the unit cells 122-1 to 122-N are stacked.

The current collectors 112 may be disposed between the cell stack 122 and inner surfaces 110AI and 110BI of the first and second end plates 110A and 110B that face the cell stack 122. The current collectors 112 serve to collect the electric energy generated by the flow of electrons in the cell stack 122 and to supply the electric energy to a load that uses the fuel cell 100.

For convenience of description, the illustration of the current collectors 112 is omitted from FIG. 2.

Further, at least one of the first end plate 110A or the second end plate 110B may include a plurality of manifolds (or communicating portions) M. It is illustrated in FIGS. 1 to 4 that each of the first and second end plates 110A and 110B includes the manifolds M. However, according to another embodiment, only one of the first and second end plates 110A and 110B may include the manifolds M, and the other one of the first and second end plates 110A and 110B may not include manifolds M. The fuel cell 100 according to the embodiment is not limited as to the specific positions at which the manifolds M are disposed.

Each of the first and second separators 242 and 244 shown in FIG. 3 may include manifolds that are formed in the same shape at the same positions as the manifolds M of a corresponding one of the first and second end plates 110A and 110B shown in FIGS. 1, 2, 4 and 5. Here, the manifolds M may include an inlet manifold and an outlet manifold. Hydrogen and oxygen, which are reactant gases necessary in the membrane electrode assembly 210, may be introduced from the outside into the cell stack 122 through the inlet manifold M. Gas or liquid, in which the reactant gases humidified and supplied to the cell and the condensate water generated in the cell are combined, may be discharged to the outside of the fuel cell 100 through the outlet manifold M. The cooling medium may flow from the outside into the cell stack 122 through the inlet manifold M and may flow from the cell stack 122 to the outside through the outlet manifold M. As described above, the manifolds M allow the fluid to flow into and out of the membrane electrode assembly 210.

The enclosure 300 may be disposed so as to surround the cell stack 122 disposed between the first end plate 110A and the second end plate 110B. According to the embodiment, the enclosure 300 may serve as a clamping member for clamping the unit cells 122-1 to 122-N together with the first and second end plates 110A and 110B in the first direction (e.g., the x-axis direction). That is, the clamping pressure of the cell stack 122 may be maintained by the first and second end plates 110A and 110B and the enclosure 300, which have rigid structures. Further, the enclosure 300 may be disposed so as to surround the side portions of the cell stack 122 between the opposite ends of the cell stack 122, and thus the cell stack 122 may be protected by the enclosure 300. According to the embodiment, the enclosure 300 preferably is not an assembly type in which two parts are joined together, but instead, preferably is of a unitary type formed using a single part.

Hereinafter, the enclosure 300 according to the embodiment will be described with reference to FIGS. 1, 2 and 6.

Figure 6:
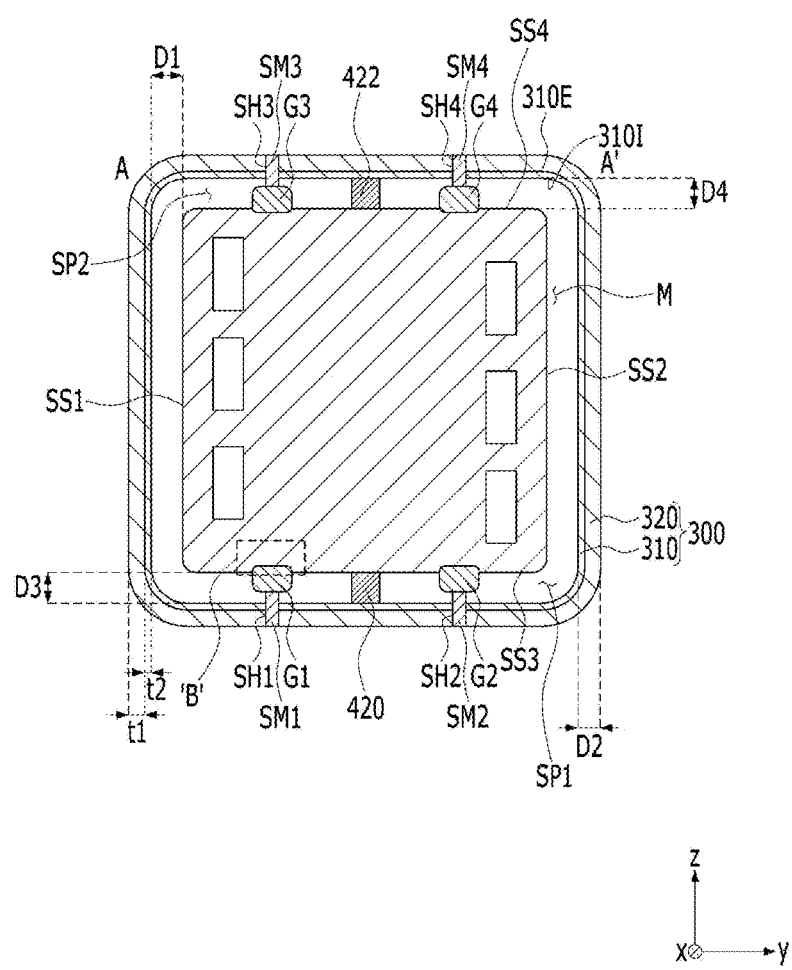
FIG. 6 is a cross-sectional view taken along line A-A' in FIG. 1.

FIG. 6 is a cross-sectional view taken along line A-A' in FIG. 1.

For better understanding of the fuel cell 100 according to the embodiment, the guide members G1 to G4 and the support members SM1 to SM4 used in manufacturing the fuel cell 100 are shown in FIG. 6. However, the fuel cell 100 according to the embodiment does not include the guide members G1 to G4 and the support members SM1 to SM4. This is because the guide members G1 to G4 and the support members SM1 to SM4 are removed after completing the manufacture of the fuel cell. This will be described in detail based on a method of manufacturing the fuel cell 100 to be described later with reference to FIGS. 9 and 10.

According to the embodiment, the enclosure 300 may include a body 310. In addition, the enclosure 300 may further include a rigidity-enhancing part 320. The body 310 surrounds the side portions of the cell stack 122, and has opposite ends 310E1 and 310E2, which are coupled to the first and second end plates 110A and 110B. Among the opposite ends 310E1 and 310E2 of the body 310, one end 310E1 may be coupled to the first end plate 110A, and the opposite end 310E2 may be coupled to the second end plate 110B.

Further, the second end plate 110B and the enclosure 300 may be integrally formed with each other. That is, the second end plate 110B and the enclosure 300 may be formed as a unitary structure.

The rigidity-enhancing part 320 may be disposed at any point between the opposite ends 310E1 and 310E2 of the body 310. For example, the rigidity-enhancing part 320 may be disposed in the middle between the opposite ends 310E1 and 310E2 of the body 310. In one embodiment, the rigidity-enhancing part 320 may be disposed at the center between the opposite ends 310E1 and 310E2 of the body 310. In this case, the first distance L1 between one end 310E1 of the body 310 and the rigidity-enhancing part 320 may be the same as the second distance L2 between the opposite end 310E2 of the body 310 and the rigidity-enhancing part 320.

In the case in which the rigidity-enhancing part 320 is disposed in the middle between the opposite ends 310E1 and 310E2 of the body 310, the rigidity-enhancing part 320 enables the enclosure 300 to withstand load applied to the body 310 when the fuel cell 100 is manufactured, which will be described later. In particular, in the case in which the rigidity-enhancing part 320 is disposed at the center between the opposite ends 310E1 and 310E2 of the body 310, the rigidity-enhancing part 320 enables the enclosure 300 to uniformly withstand load applied to the body 310.

Further, the rigidity-enhancing part 320 may be disposed in a strap shape on the body 310. However, the embodiment is not limited to any specific shape of the rigidity-enhancing part 320.

Further, the rigidity-enhancing part 320 may be disposed on at least one of an inner surface 310I or an outer surface 310E of the body 310. For example, as shown in FIG. 6, the rigidity-enhancing part 320 may be disposed on the outer surface 310E of the body 310. As such, in the case in which the rigidity-enhancing part 320 is disposed on the outer surface 310E of the body 310, it is possible to prevent an increase in the volume of the space between the body 310 and the cell stack 122, compared to the configuration in which the rigidity-enhancing part 320 is disposed on the inner surface 310I of the body 310.

Further, although the body 310 and the rigidity-enhancing part 320 are illustrated as being separately provided, the embodiment is not limited thereto. According to another embodiment, the body 310 and the rigidity-enhancing part 320 may be integrally formed with each other. That is, the body 310 and the rigidity-enhancing part 320 may be embodied as a unitary part, rather than two separate parts.

Further, the rigidity-enhancing part 320 may have a first thickness t1 that is greater than a second thickness t2 of the body 310. The reason for this is to enable the rigidity-enhancing part 320, which has the first thickness t1 greater than the second thickness t2, to withstand load applied to the body 310, which has the second thickness t2 less than the first thickness t1, when the fuel cell 100 is manufactured, which will be described later.

The side portions of the cell stack 122 may include first to fourth side portions SS1 to SS4. For example, as shown in FIG. 6, in the case in which the cell stack 122 has a rectangular-shaped cross-section, the side portions of the cell stack 122 may be divided into the first to fourth side portions SS1 to SS4. Although not illustrated, in the case in which the cross-sectional shape of the cell stack 122 is a polygon having sides, the number of which is P, the side portions of the cell stack 122 may be divided into first to Pth side portions SS1 to SSP. Here, "P" may be a positive integer of 3 or greater.

The first side portion SS1 of the cell stack 122 is the portion in which one of the manifolds M is disposed. The second side portion SS2 is the portion in which the other one of the manifolds M is disposed. The second side portion SS2 may be disposed opposite the first side portion SS1 in a second direction (e.g., the y-axis direction), which is different from the first direction (e.g., the x-axis direction).

The third and fourth side portions SS3 and SS4 of the cell stack 122 may be the side portions that are disposed opposite each other in a third direction (e.g., the z-axis direction). Here, the third direction may be a direction that intersects the first direction and the second direction. As described above, the first direction may be a direction (e.g., the x-axis direction) in which the unit cells 122-1 to 122-N are stacked, and the second direction may be a direction (e.g., the y-axis direction) in which the first side portion SS1 and the second side portion SS2 face each other.

The manifolds M may be disposed in each of the first and second side portions SS1 and SS2, and flow passages may be formed in each of the third and fourth side portions SS3 and SS4.

In addition, the enclosure 300 may include at least one support through-hole SH formed therein. Here, the number of the support through-holes SH may be the same as or different from the number of the guide members G1 to G4. For example, as shown in FIG. 6, when the number of the guide members G1 to G4 is four, the number of the support through-holes SH may also be four.

Referring to FIG. 6, the enclosure 300 may further include at least one support through-hole formed therein, which penetrates the rigidity-enhancing part 320 and the body 310 and faces at least one of the third side portion SS3 or the fourth side portion SS4.

For example, the enclosure 300 may include only a first support through-hole formed therein. The first support through-hole may be a through-hole that penetrates the rigidity-enhancing part 320 and the body 310 and faces the third side portion SS3 of the cell stack 122. As shown in FIG. 6, the enclosure 300 may include two first support through-holes SH1 and SH2 formed therein.

Alternatively, the enclosure 300 may include only a second support through-hole formed therein. The second support through-hole may be a through-hole that penetrates the rigidity-enhancing part 320 and the body 310 and faces the fourth side portion SS4 of the cell stack 122. As shown in FIG. 6, the enclosure 300 may include two second support through-holes SH3 and SH4 formed therein.

Alternatively, the enclosure 300 may include both the first and second support through-holes formed therein.

When the fuel cell 100 is manufactured, which will be described later, the support members SM1 to SM4 may be respectively fitted into the support through-holes SH1 to SH4, and thus the support members SM1 to SM4 may respectively support the guide members G1 to G4. For example, the support members SM1 to SM4 may be male screws, and the support through-holes SH1 to SH4 may be female screws, into which the male screws are fastened and which have thread crests and threaded rods. In this case, the support members SM1 to SM4 may have sufficient lengths so as to be inserted into the support through-holes SH1 to SH4 toward the cell stack 122 until the support members SM1 to SM4 come into contact with the guide members G1 to G4, thereby supporting the guide members G1 to G4. For example, the length of each of the support members SM1 to SM4 may be equal to or greater than the total sum of the first thickness t1, the second thickness t2, and the first distance D1, which will be described later.

Further, the rigidity of the support members SM1 to SM4 may be similar to or higher than the rigidity of the guide members G1 to G4 so that the support members SM1 to SM4 serve to securely support the guide members G1 to G4.

Hereinafter, the guide through-holes GTH1 to GTH4 shown in FIG. 4 and the guide support holes GSH1 to GSH4 shown in FIG. 5 will be described based on the first to fourth side portions SS1 to SS4 of the cell stack 122 defined with reference to FIG. 6.

The guide through-holes formed in the first end plate 110A shown in FIG. 4 may include first guide through-holes and second guide through-holes.

The first guide through-holes GTH1 and GTH2 shown in FIG. 4 may overlap a first space SP1 shown in FIG. 6, defined between the third side portion SS3 of the cell stack 122 and the enclosure 300, in the first direction (e.g., the x-axis direction).

The second guide through-holes GTH3 and GTH4 shown in FIG. 4 may overlap a second space SP2 shown in FIG. 6, defined between the fourth side portion SS4 of the cell stack 122 and the enclosure 300, in the first direction (e.g., the x-axis direction).

The guide support holes formed in the second end plate 110B shown in FIG. 5 may include first guide support holes and second guide support holes.

The first guide support holes GSH1 and GSH2 shown in FIG. 5 may overlap the first space SP1 shown in FIG. 6, defined between the third side portion SS3 of the cell stack 122 and the enclosure 300, in the first direction (e.g., the x-axis direction).

The second guide support holes GSH3 and GSH4 shown in FIG. 5 may overlap the second space SP2 shown in FIG. 6, defined between the fourth side portion SS4 of the cell stack 122 and the enclosure 300, in the first direction (e.g., the x-axis direction).

As described above, since each of the guide through-holes GTH1 to GTH4 and the guide support holes GSH1 to GSH4 shown in FIGS. 4 and 5 overlaps a corresponding one of the first and second spaces SP1 and SP2, the first and second guide members G1 and G2 may be connected to the first and second end plates 110A and 110B through the first space SP1, and the third and fourth guide members G3 and G4 may be connected to the first and second end plates 110A and 110B through the second space SP2.

As described above, the guide members G1 to G4 pass through the first and second spaces SP1 and SP2 between the enclosure 300 and the third and fourth side portions SS3 and SS4 of the cell stack 122, in which the manifolds M are not formed, rather than between the enclosure 300 and the first and second side portions SS1 and SS2 of the cell stack 122, in which the manifolds M are formed. This is because the rigidity of the third and fourth side portions SS3 and SS4 of the cell stack 122, in which the manifolds M are not formed, is higher than the rigidity of the first and second side portions SS1 and SS2 of the cell stack 122, in which the manifolds M are formed.

Further, referring again to FIG. 6, the outer surface of the first side portion SS1 of the cell stack 122 and the enclosure 300 may be spaced apart from each other by a first distance D1, the outer surface of the second side portion SS2 of the cell stack 122 and the enclosure 300 may be spaced apart from each other by a second distance D2, the outer surface of the third side portion SS3 of the cell stack 122 and the enclosure 300 may be spaced apart from each other by a third distance D3, and the outer surface of the fourth side portion SS4 of the cell stack 122 and the enclosure 300 may be spaced apart from each other by a fourth distance D4.

Here, according to the embodiment, each of the first and second distances D1 and D2 may be shorter than the third distance D3 or the fourth distance D4. This is because the first and second spaces SP1 and SP2 need to have a space for the guide members G1 to G4.

Thus, in the process of manufacturing the fuel cell 100, if the first and second distances D1 and D2 corresponding to the spaces between the cell stack 122 and the enclosure 300, through which the guide members G1 to G4 do not pass, are reduced, the overall size of the fuel cell 100 may be reduced.

In addition, the fuel cell 100 according to the embodiment may further include insulating support members 420 and 422. The insulating support members 420 and 422 may be disposed between the outer surface of the cell stack 122 and the inner surface of the enclosure 300 and may serve as a reinforcing structure. When the fuel cell 100 according to the embodiment is installed in a vehicle, the insulating support members 420 and 422 may serve to prevent deformation of the cell stack 122 due to external impact such as vibration or collision during travel of the vehicle. To this end, the insulating support members 420 and 422 may be formed of an insulating material in order to prevent an electrical short between the separator of the cell stack 122 serving as a live part and the enclosure 300 serving as an electrical ground and to secure excellent insulation resistance.

It is illustrated in FIG. 6 that the insulating support members 420 and 422 are disposed only between the enclosure 300 and the third and fourth side portions SS3 and SS4 of the cell stack 122. However, the insulating support members may also be disposed between the enclosure 300 and each of the first and second side portions SS1 and SS2 of the cell stack 122. The fuel cell 100 according to the embodiment is not limited as to the specific positions at which the insulating support members are disposed, the specific number of insulating support members, and the presence or absence of the insulating support members.

Figure 7:
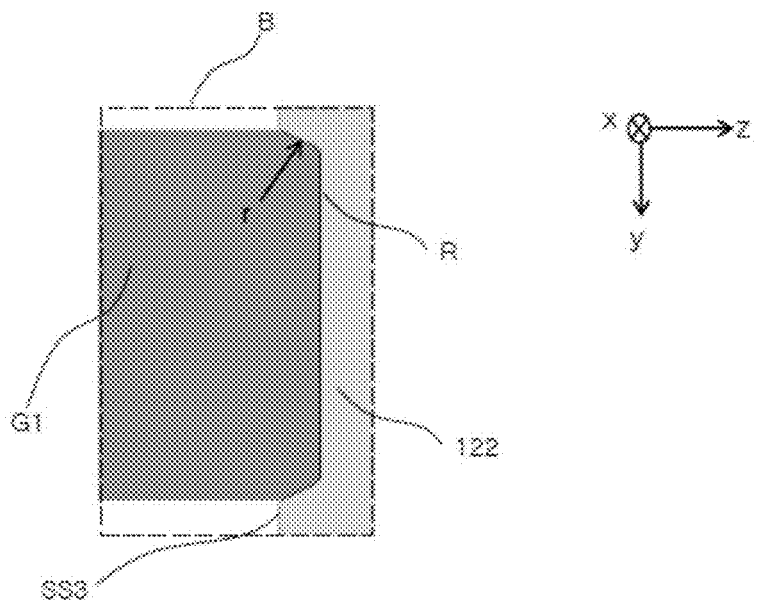
FIG. 7 is an enlarged cross-sectional view of portion 'B' shown in FIG. 6.

FIG. 7 is an enlarged cross-sectional view of portion 'B' shown in FIG. 6.

Referring to FIG. 7, the third side portion SS3 of the cell stack 122 may include a guide-receiving recess R formed therein, which faces the inner surface of the body 310 of the enclosure 300 and extends along the guide member G1 in the first direction. The guide-receiving recess R serves to receive a portion of the guide member G1. Like the guide-receiving recess R receiving the guide member G1 shown in FIG. 7, additional guide-receiving recesses R may be formed in the third and fourth side portions SS3 and SS4 of the cell stack 122 in order to receive the other guide members G2 to G4.

Since the guide-receiving recesses R serve to receive the guide members G1 to G4, the number of the guide-receiving recesses R may be the same as the number of guide members G1 to G4.

Further, the edge of each guide-receiving recess R may be formed in a round shape so as to have a predetermined radius of curvature r.

Furthermore, the depth of the guide-receiving recess R may be determined in consideration of the tolerance between the guide members G1 to G4 and the cell stack 122.

In addition, the fuel cell 100 may further include a cap. The cap may be disposed in at least one of the guide support holes GSH1 to GSH4 or the guide through-holes GTH1 to GTH4.

For example, the fuel cell 100 may further include only a first cap 430 shown in FIG. 4, or may further include only a second cap 440 shown in FIG. 5.

The first cap 430 may be disposed in at least one of the guide through-holes GTH1 to GTH4 formed in the first end plate 110A.

Further, the second cap 440 may be disposed in at least one of the guide support holes GSH1 to GSH4 formed in the second end plate 110B.

Alternatively, the fuel cell 100 may include both the first cap 430 and the second cap 440.

When the fuel cell 100 is manufactured, which will be described later, after the guide members G1 to G4 are removed, the first cap 430 may be disposed in each of the guide through-holes GTH1 to GTH4, and the second cap 440 may be disposed in each of the guide support holes GSH1 to GSH4 (if the guide support holes GSH1 to GSH4 are not blind holes, but are through-holes). Thereby, the internal space between the enclosure 300 and the cell stack 122 may be sealed from the outside of the first and second end plates 110A and 110B. In this manner, the first and second caps 430 and 440 may perform a watertight function for the fuel cell 100. To this end, the first and second caps 430 and 440 may be formed of rubber. However, the embodiment is not limited as to the specific material of the first and second caps 430 and 440.

Figure 8:
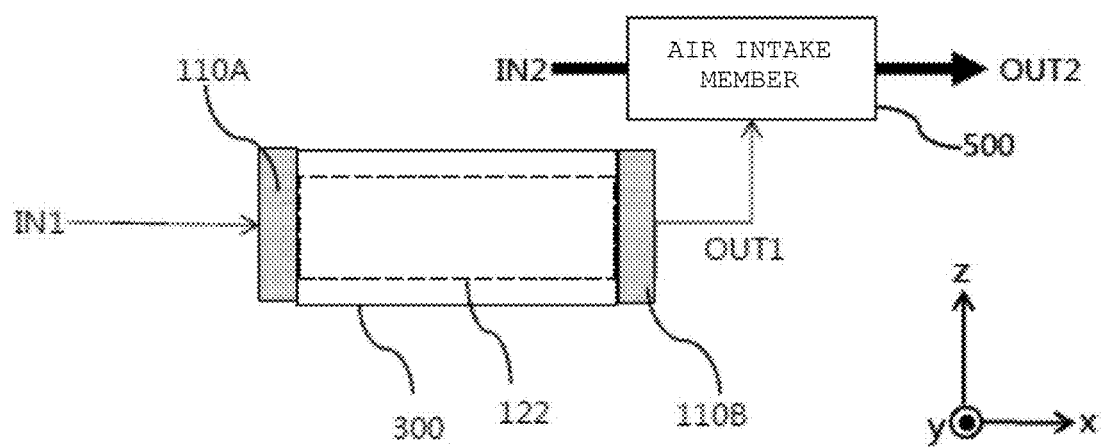
FIG. 8 is an external conceptual view of a fuel cell according to another embodiment.

FIG. 8 is an external conceptual view of a fuel cell according to another embodiment.

The fuel cell shown in FIG. 8 may include first and second end plates 110A and 110B, a cell stack 122, an enclosure 300, and an air intake member (or an air ventilation member) 500. Here, since the cell stack 122 is enclosed by the enclosure 300, it is not visible from the outside. However, the cell stack 122 is indicated by a dotted line in FIG. 8 for better understanding.

In FIG. 8, since the first and second end plates 110A and 110B, the cell stack 122, and the enclosure 300 are the same as described above, these components are denoted by the same reference numerals, and a duplicate explanation thereof is omitted. That is, the fuel cell shown in FIG. 8 is the same as the fuel cell according to the above-described embodiment, except that the fuel cell shown in FIG. 8 further includes the air intake member 500.

The air intake member 500 suctions first air OUT1, which is discharged from the outlet after being suctioned through the inlet and circulating in the internal space between the enclosure 300 and the cell stack 122. That is, the inlet (a vent filter or a drain hole) is a part through which second air IN1 is suctioned from the outside of the fuel cell into the internal space between the enclosure 300 and the cell stack 122, and the outlet (or a vent port) is a part through which the first air OUT1 is discharged.

The air intake member 500 suctions external air IN2 using an air compressor, and a negative pressure is formed in the air intake member 500 in accordance with the flow rate of the air IN2 introduced into the air intake member 500.

Here, since the air intake member 500 is connected to the outlet discharging the first air OUT1, the first air OUT1 discharged from the outlet may be suctioned into the air intake member 500 by the negative pressure in the air intake member 500, and then may be discharged to the outside through an output terminal OUT2.

The humidity may increase in the space between the outer surface of the cell stack 122 and the inner surface of the enclosure 300 due to moisture leaking to the outside during the operation of the cell stack 122. If moisture accumulates above the saturated water vapor pressure level in this space, condensation occurs inside the cell stack 122. However, since the air discharged from the outlet is suctioned by the air intake member 500, the air circulates in the space between the outer surface of the cell stack 122 and the inner surface of the enclosure 300, thereby appropriately managing the humidity in this space.

The inlet may be disposed in any one of the first and second end plates 100A and 100B, and the outlet may be disposed in the other one of the first and second end plates 100A and 100B.

It is illustrated in FIG. 8 that the outlet is disposed in the second end plate 110B and the inlet is disposed in the first end plate 110A. However, unlike the configuration shown in FIG. 8, the outlet may be disposed in the first end plate 110A, and the inlet may be disposed in the second end plate 110B.

Among the guide through-holes GTH1 to GTH4 formed in the first end plate 110A shown in FIG. 4 and the guide support holes GSH1 to GSH4 formed in the second end plate 110B shown in FIG. 5, some holes may correspond to inlets, and other holes may correspond to outlets. In this manner, the holes formed in the respective end plates 110A and 110B may be used for different purposes in order to manufacture the fuel cell 100.

Hereinafter, a method of manufacturing the fuel cell 100 according to the embodiment will be described with reference to the accompanying drawings. The method will be described on the assumption that a plurality of guide support holes and a plurality of guide trough-holes are provided. However, the following description may also be applied to the configuration in which a single guide support hole is provided or a single guide through-hole is provided.

Figure 9:
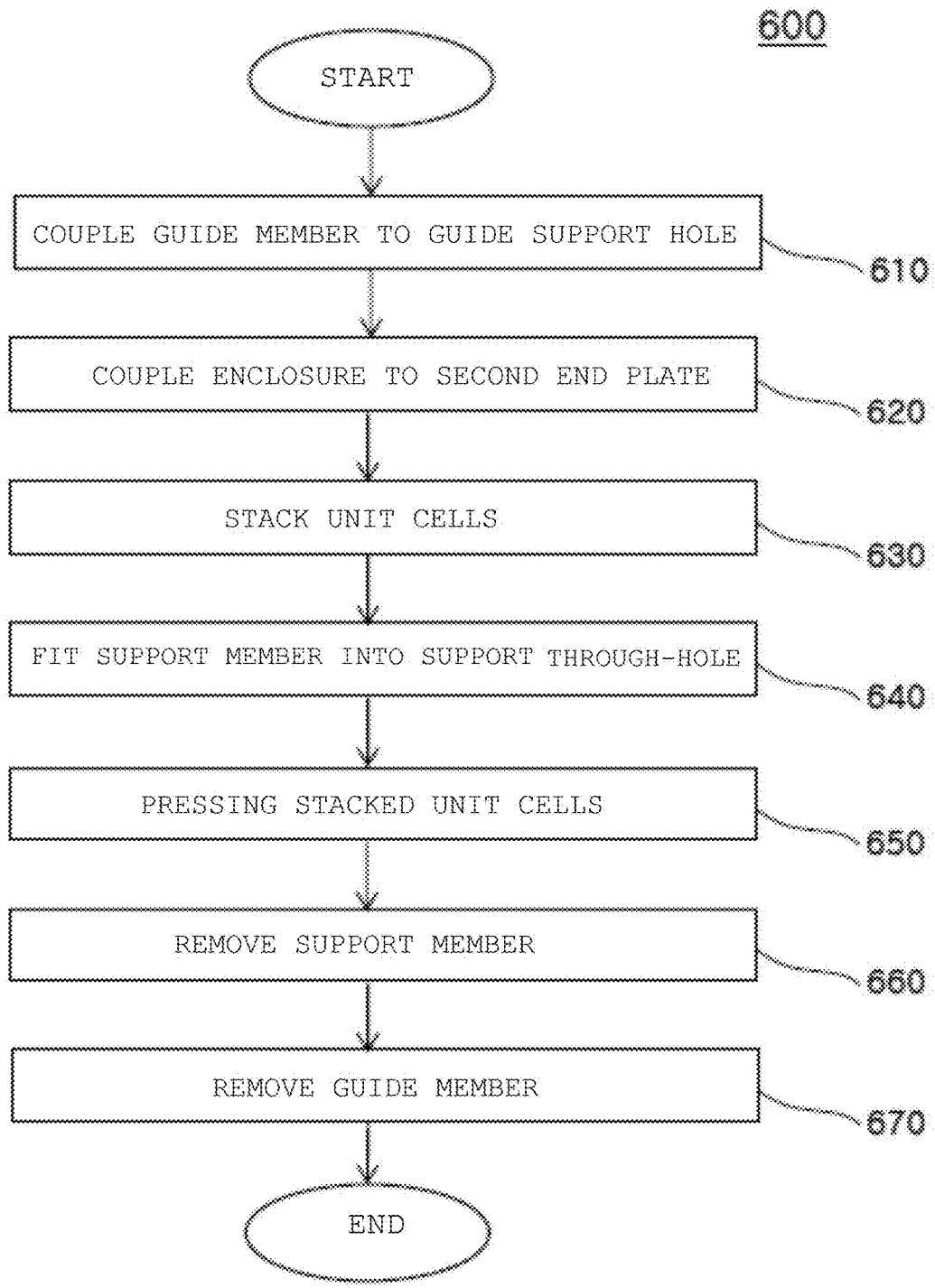
FIG. 9 is a flowchart showing a method of manufacturing a fuel cell according to an embodiment.

FIG. 9 is a flowchart showing a method 600 of manufacturing the fuel cell according to an embodiment. FIGS. 10(a) to 10(f) are sequential steps of the method 600 of manufacturing the fuel cell shown in FIG. 9.

In FIGS. 10(a) to 10(f), the same reference numerals are used to designate the same parts as those shown in FIGS. 1 to 7, and a duplicate explanation thereof will be omitted.

As shown in FIG. 10(a), a second end plate 110B including a plurality of guide support holes GSH1 to GSH4 formed therein is prepared, and as shown in FIG. 10(b), guide members G1 to G4 are respectively coupled to the guide support holes GSH1 to GSH4 (step 610). Each of the guide support holes GSH1 to GSH4 serves to support a corresponding one of the guide members G1 to G4. Thus, each of the guide support holes GSH1 to GSH4 may be a blind hole or a through-hole.

Here, although it is illustrated that four guide members G1 to G4 are provided, the embodiment is not limited as to the specific number of the guide members G1 to G4. The number of the guide members may be three or greater.

After step 610, as shown in FIG. 10(c), an enclosure 300 is coupled to the second end plate 100B while surrounding the guide members G1 to G4 (step 620).

After step 620, as shown in FIG. 10(d), a plurality of unit cells 122-1 to 122-N is stacked while being guided by the guide members G1 to G4, and then a first end plate 110A is stacked on the last stacked unit cell 122-N of the unit cells 122-1 to 122-N in a manner such that the guide members G1 to G4 are respectively fitted into a plurality of guide through-holes GTH1 to GTH4 formed in the first end plate 110A (step 630).

After step 630, the unit cells 122-1 to 122-N stacked between the first and second end plates 110A and 110B are pressed (step 650).

Before the unit cells 122-1 to 122-N are pressed, the length of the stacked unit cells 122-1 to 122-N in the stacking direction is greater than the length L3 of the enclosure 300. Thus, in order to align the stacked unit cells 122-1 to 122-N before pressing the unit cells 122-1 to 122-N, the length L4 of the guide members G1 to G4 may be set to be greater than the length L3 of the enclosure 300. As described above, the guide through-holes GTH1 to GTH4 formed in the first end plate 110A are holes that allow the guide members G1 to G4 to pass therethrough.

As a result of performing step 650, as shown in FIG. 10(e), the first end plate 110A may be coupled in contact with one of the opposite ends of the enclosure 300.

After step 650, the guide members G1 to G4 are removed, thereby completing the manufacture of the fuel cell 100, as shown in FIG. 10(e) (step 670).

According to another embodiment, before performing step 650 to press the cell stack, on which the first end plate 110A has been stacked in step 630, support members SM1 to SM4 may be respectively fitted into first and second support through-holes SH (SH1 to SH4) in order to support the guide members G1 to G4 (step 640).

Further, after performing step 650 pressing the cell stack and before performing step 670 to remove the guide members G1 and G4, the support members SM1 to SM4 may be removed from the first and second support through-holes SH (SH1 to SH4) (step 660).

As described above, the support members SM1 to SM4 have a structure capable of being fitted into the first and second support through-holes SH (SH1 to SH4) and thereafter being removed therefrom.

Hereinafter, a fuel cell and a method of manufacturing the same according to a comparative example and a fuel cell and a method of manufacturing the same according to the embodiment will be described as follows.

According to a comparative example, a lower enclosure and an upper enclosure are joined together to manufacture a fuel cell. Thus, watertightness between the lower and upper enclosures and the end plates may not be ensured. Therefore, additional work for improving watertightness is required. For example, a separate gasket may be required for watertightness, and accordingly the manufacturing process may become complicated. On the other hand, according to the embodiment, since the fuel cell 100 is manufactured using the enclosure 300, which is embodied as a unitary part, rather than two separate parts, watertight performance may be improved compared to the comparative example. Further, since a separate watertight member such as a gasket is not required, the manufacturing process may be simplified.

In addition, according to the comparative example, since the length of the stacked unit cells is greater than the length of the lower enclosure, a separate guide device for guiding the stacked cells protruding outside the lower enclosure is additionally required. The stacked cells are pressed using additional equipment, and thereafter the upper enclosure is joined to the lower enclosure. This process may make it difficult to align the lower enclosure and the additional equipment with each other within ±0.4 mm. On the other hand, according to the embodiment, since the fuel cell 100 is manufactured using the enclosure 300 having a unitary structure, the stacked cells may be aligned more accurately than the comparative example.

Figure 11:
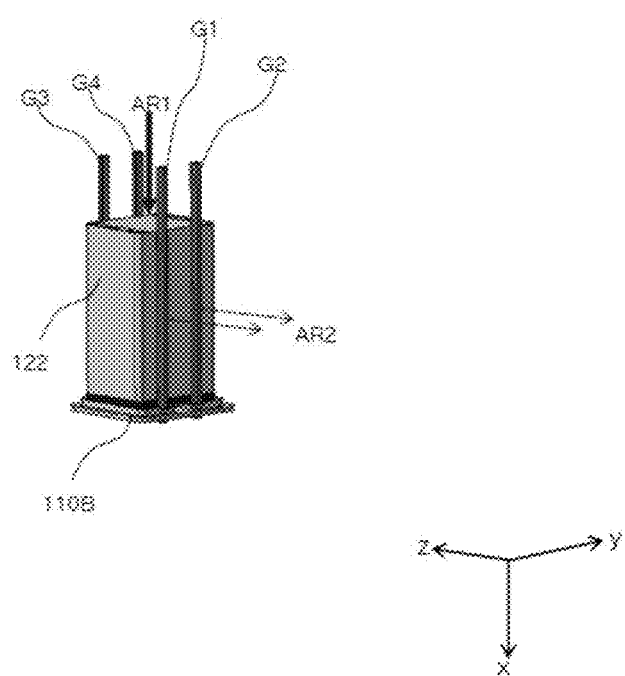
FIG. 11 is a view related to the method of manufacturing the fuel cell.

FIG. 11 is a view related to the method of manufacturing the fuel cell. Here, the same components as those of the fuel cell 100 according to the embodiment are denoted by the same reference numerals.

A plurality of unit cells 122-1 to 122-N is stacked in an enclosure 300 using guide members G1 to G4. In this state, when the stacked cells are pressed in the direction indicated by the arrow AR2 in FIG. 11, a large amount of load may be applied to the guide members G1 to G4 in the direction indicated by the arrow AR2. Thus, the guide members G1 to G4 may be deformed. In order to prevent this phenomenon, the guide members G1 to G4 may increase in thickness. However, the increase in the thickness of the guide members G1 to G4 may unnecessarily increase the size of the space between the cell stack 122 and the enclosure 300, through which the guide members G1 to G4 pass, thus leading to an increase in the overall size of the fuel cell. Alternatively, instead of increasing the thickness of the guide members G1 to G4, the rigidity of the enclosure 300 may be increased so that the thickness and the weight of the enclosure 300 may also be increased, which results in an increase in the weight of the fuel cell. On the other hand, according to the embodiment, since the rigidity-enhancing part 320 is provided in the middle of the enclosure 300, the enclosure 300 is capable of withstanding the load generated when pressing the stacked cells and supporting the guide members G1 to G4 so as to prevent deformation of the guide members G1 to G4 due to the load caused by the pressing. Therefore, it is not necessary to increase the weight of the enclosure 300 to increase the rigidity thereof, and thus it is possible to avoid an increase in the weight of the fuel cell 100. Further, it is not necessary to increase the thickness of the guide members G1 to G4. Furthermore, according to the embodiment, before load is applied to the stacked cells, the support members SM are fitted into the support through-holes SH to support the guide members G1 to G4 so that the guide members G1 to G4 may withstand the load caused by the pressing. Accordingly, it is not necessary to increase the thickness of the guide members G1 to G4. As a result, the space occupied by the guide members G1 to G4 between the cell stack 122 and the enclosure 300 may be reduced, and consequently an increase in the size of the fuel cell 100 may be prevented.

In the state in which the stacked cells stand upright, the stacked cells may be pressed in the vertical direction, and in the state in which the stacked cells lie horizontally, the stacked cells may be pressed in the horizontal direction. At this time, the cells may be damaged due to friction between the stacked cells and the guide members G1 to G4. In order to prevent this phenomenon, according to the embodiment, as shown in FIG. 7, guide-receiving recesses R are formed in the portions at which the guide members G1 to G4 and the stacked cells 122 are in contact with each other, thereby ensuring tolerance and preventing damage to the cells. Further, the guide-receiving recesses R have a rounded edge and a depth in consideration of the tolerance between the guide members G1 to G4 and the cell stack 122, thereby more securely preventing the cell stack 122 from being damaged by the guide members G1 to G4.

As is apparent from the above description, according to a fuel cell and a method of manufacturing the same according to the embodiment, since a fuel cell is manufactured using an enclosure, which is embodied as a unitary part, rather than two separate parts, watertight performance may be improved compared to a comparative example. Further, since a separate watertight member such as a gasket is not required, the manufacturing process may be simplified.

In addition, according to the embodiment, since a fuel cell is manufactured using an enclosure having a unitary structure, a plurality of stacked cells may be aligned more accurately.

In addition, according to the embodiment, since a rigidity-enhancing part is provided in the middle of an enclosure, the enclosure is capable of withstanding the load generated when pressing the stacked cells and supporting guide members so as to prevent deformation of the guide members due to the load caused by the pressing. Therefore, it is not necessary to increase the weight of the enclosure to increase the rigidity thereof, and thus it is possible to avoid an increase in the weight of the fuel cell. Further, it is not necessary to increase the thickness of the guide members.

In addition, according to the embodiment, before load is applied to the stacked cells, support members are fitted into support through-holes to support the guide members so that the guide members may withstand the load caused by the pressing. Accordingly, it is not necessary to increase the thickness of the guide members. As a result, the space occupied by the guide members between the cell stack and the enclosure may be reduced, and consequently an increase in the size of the fuel cell may be prevented.

In addition, according to the embodiment, guide-receiving recesses are formed in the portions at which the guide members and the stacked cells are in contact with each other, thereby ensuring tolerance and preventing damage to the cells. Further, the guide-receiving recesses have a rounded edge and a depth in consideration of the tolerance between the guide members and the cell stack, thereby more securely preventing the cell stack from being damaged by the guide members.

The above-described various embodiments may be combined with each other without departing from the object of the present disclosure unless being contrary to each other. In addition, for any element, which is not described in detail, of any of the various embodiments, refer to the description of the element having the same reference numeral of another embodiment.

While the present disclosure has been particularly shown and described with reference to exemplary embodiments thereof, these embodiments are only proposed for illustrative purposes and do not restrict the present disclosure, and it will be apparent to those skilled in the art that various changes in form and detail may be made without departing from the essential characteristics of the embodiments set forth herein. For example, respective configurations set forth in the embodiments may be modified and applied. Further, differences in such modifications and applications should be construed as falling within the scope of the present disclosure as defined by the appended claims.

What is claimed is:

1. A fuel cell, comprising:
   a cell stack comprising a plurality of unit cells stacked in a first direction;
   a first end plate comprising a guide through-hole formed therein, the first end plate being disposed on one end of two ends of the cell stack;
   a second end plate comprising a guide support hole formed therein, the guide support hole overlapping the guide through-hole in the first direction, the second end plate being disposed on an opposite end of the two ends of the cell stack; and
   an enclosure surrounding a side portion between the two ends of the cell stack together with the first end plate and the second end plate, the enclosure being formed as a unitary structure,
   wherein the enclosure comprises a body surrounding the side portion of the cell stack and first and second ends coupled to the first end plate and the second end plate, respectively,
   wherein the cell stack includes at least one guide receiving recess,
   wherein the at least one guide receiving recess is disposed at an outer surface of the side portion of the cell stack with being spaced apart from corners of the cell stack, and
   wherein a space interposed between the guide through-hole and the guide support hole which face each other in the first direction does not include a guide member and is empty, the space being between the enclosure and the side portion of the cell stack.

2. The fuel cell according to claim 1, wherein the second end plate and the enclosure are integrally formed with each other.

3. The fuel cell according to claim 1, wherein the enclosure further comprises a rigidity-enhancing part disposed between the first and second ends of the body.

4. The fuel cell according to claim 3, wherein a first distance between the first end of the body and the rigidity-enhancing part is same as a second distance between the second end of the body and the rigidity-enhancing part.

5. The fuel cell according to claim 3, wherein the rigidity-enhancing part is disposed in a strap shape on the body.

6. The fuel cell according to claim 5, wherein the rigidity-enhancing part is disposed on at least one of an inner surface or an outer surface of the body.

7. The fuel cell according to claim 6, wherein the body and the rigidity-enhancing part are integrally formed with each other.

8. The fuel cell according to claim 1, further comprising:
   an air intake member configured to suction first air that has circulated in an internal space between the enclosure and the cell stack,
   wherein any one of the guide support hole and the guide through-hole corresponds to an inlet suctioning second air from an outside into the internal space between the enclosure and the cell stack, and
   wherein a remaining one of the guide support hole and the guide through-hole corresponds to an outlet discharging the first air to the air intake member.

9. The fuel cell according to claim 3, wherein the rigidity-enhancing part has a first thickness greater than a second thickness of the body.

10. The fuel cell according to claim 3, wherein the side portion of the cell stack comprises:
    a first side portion in which a first manifolds is disposed;
    a second side portion in which a second manifold is disposed, the second side portion being disposed opposite the first side portion in a second direction that is different from the first direction; and
    a third side portion and a fourth side portion disposed opposite each other in a third direction that intersects the first direction and the second direction, and
    wherein the enclosure further comprises at least one support through-hole formed therein, the support through-hole penetrating the rigidity-enhancing part and the body and facing at least one of the third side portion or the fourth side portion.

11. The fuel cell according to claim 10, wherein the guide support hole formed in the second end plate comprises at least one of:
    a first guide support hole overlapping a first space, defined between the third side portion of the cell stack and the enclosure, in the first direction; or
    a second guide support hole overlapping a second space, defined between the fourth side portion of the cell stack and the enclosure, in the first direction.

12. The fuel cell according to claim 10, wherein the guide through-hole formed in the first end plate comprises at least one of:
    a first guide through-hole overlapping a first space, defined between the third side portion of the cell stack and the enclosure, in the first direction; or a second guide through-hole overlapping a second space, defined between the fourth side portion of the cell stack and the enclosure, in the first direction.

13. The fuel cell according to claim 10, wherein an outer surface of the first side portion of the cell stack and the enclosure are spaced apart from each other by a first distance,
wherein an outer surface of the second side portion of the cell stack and the enclosure are spaced apart from each other by a second distance,
wherein an outer surface of the third side portion of the cell stack and the enclosure are spaced apart from each other by a third distance,
wherein an outer surface of the fourth side portion of the cell stack and the enclosure are spaced apart from each other by a fourth distance, and
wherein each of the first distance and the second distance is shorter than the third distance or the fourth distance.

14. The fuel cell according to claim 10, wherein each of the third side portion and the fourth side portion of the cell stack comprises the guide-receiving recess formed therein, the guide-receiving recess facing an inner surface of the enclosure and extending in the first direction.

15. The fuel cell according to claim 1, further comprising at least one insulating support member disposed between the outer surface of the cell stack and an inner surface of the enclosure.

16. The fuel cell according to claim 1, wherein the side portion of the cell stack comprises:
a first side portion and a second side portion disposed opposite each other in a second direction that is different from the first direction; and
a third side portion and a fourth side portion disposed opposite each other in a third direction that intersects the first direction and the second direction, and
wherein the corners of the cell stack comprises:
a first corner between the first side portion and the fourth side portion;
a second corner between the fourth side portion and the second side portion;
a third corner between the second side portion and the third side portion; and
a fourth corner between the third side portion and the first side portion.

17. The fuel cell according to claim 16, wherein the outer surface at which the at least one guide receiving recess is disposed comprises at least one of
a first outer surface of the fourth side portion disposed between the first corner and the second corner; or
a second outer surface of the third side portion disposed between the third corner and the fourth corner.

18. The fuel cell according to claim 16, wherein a first manifold is disposed at the first side portion,
wherein a second manifold is disposed at the second side portion, the second manifold and the first manifold being opposite to each other in the second direction, and
wherein the at least one guide receiving recess is not overlapped with the first and second manifolds in the third direction.

* * * * *